No. 759,737. Patented May 10, 1904.

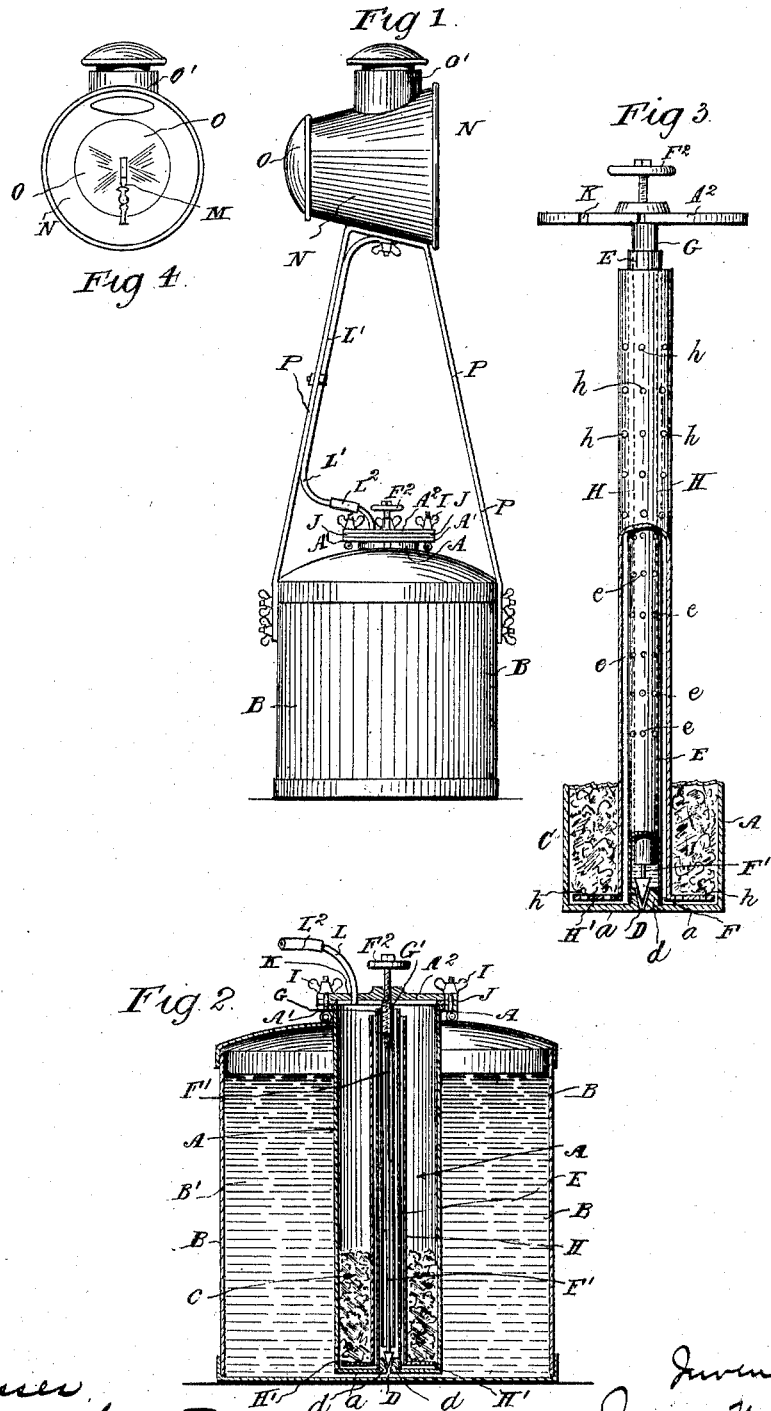

UNITED STATES PATENT OFFICE.

JAMES McCONECHY, OF GLASGOW, SCOTLAND.

ACETYLENE-GAS GENERATOR.

SPECIFICATION forming part of Letters Patent No. 759,737, dated May 10, 1904.

Application filed July 18, 1903. Serial No. 166,127. (No model.)

*To all whom it may concern:*

Be it known that I, JAMES McCONECHY, a subject of the King of Great Britain, residing at Glasgow, Scotland, have invented certain new and useful Improvements in a Combined Acetylene-Gas Generator and Lamp; and I do hereby declare the following to be a full, clear, and exact description of the invention, such as will enable others skilled in the art to which it appertains to make and use the same.

This invention, which relates to a combined acetylene-gas generator and lamp, has special reference to the generator; and it consists in the novel arrangement and combination of parts for the efficient manufacture and illumination of the gas, for which a British application for patent was made March 10, 1903, No. 5,544.

Figure 1 is a side elevation of a combined generator and lamp embodying my invention. Fig. 2 is a vertical section of the generator detached from the lamp and drawn to an enlarged scale. Fig. 3 is a similar view of that part of the generator employed in the control of the water employed from time to time in the generation of acetylene gas, also drawn to an enlarged scale; and Fig. 4 is a front view of the hood and burner detached from the other part of the apparatus.

The generator consists of a cylindrical vessel A, of convenient length, formed with an upper flange A' and rendered gas and water tight, which is immersed in an outer tank B, containing the requisite supply of water B' for the disintegration of the calcium carbid C and to reduce to a minimum the excessive heat set up by chemical action contained in the said cylindrical vessel A. The cylindrical vessel A is provided with a hole D, of small bore, drilled through a boss $d$, projecting upwardly through the center of the bottom $a$ of said vessel. In communication with the said hole D is a tube E, formed either integrally with the bottom aforesaid or screwed onto the boss $d$, which, as shown, approximates to the depth of the cylindrical vessel and is provided with holes or perforations $e$, commencing some inches upwardly from the bottom. The water percolates through these holes into the cylindrical vessel A. The hole D constitutes a conical valve-seat for a valve F, formed on the lower end of a vertical rod F', which is screwed through the lid $A^2$ and is provided with a regulating hand-wheel $F^2$. The vertical rod F', as seen, passes through the tube E and very perfectly controls the supply of water or prevents its inflow through the hole D. A tube G, of smaller bore than the tube E, is tightly screwed to the lid $A^2$ of the cylindrical vessel A by a screw-socket G', from which it depends into the tube E and by which it is surrounded. A column of water having been formed and maintained in the tube E up to the level of the first hole $e$ by percolation through the hole D acts as a fluid seal in preventing the escape of gas through the screw-joint of the controlling-rod F' and the screw-socket G'. An outer detachable tube H, of convenient depth and bore, is made to surround the said fixed inner tube E, which tube H is provided with a base H' of disklike formation, which sets upon the internal bottom $a$ of the said vessel A. The disk-like base and the cylindrical walls of the outer detachable tube H are provided with holes or perforations $h$ for the flow of water to the carbid-chamber.

The principal feature of the flanged detachable tube H is to provide means whereby the residue or deposit arising from the decomposition of the calcium carbid may be carefully withdrawn or extracted; but instead of this arrangement it may sometimes be found expedient to employ other suitable means or means coöperating with the tube H and flange or disk H' for this purpose.

The lid $A^2$ of the cylindrical vessel A is clamped rigidly in position by hinged thumb-screws I, and by virtue of a rubber washer J, inserted between the flange A' and the lid $A^2$, the said vessel is rendered gas and water tight. An orifice K, Fig. 3, is made in the said lid $A^2$, which is in communication with a metal tube L or L', Fig. 1, connecting which is a short section of rubber tube $L^2$, Figs. 1 and 2, for conducting the gas to the burner M, Fig. 4, mounted in the hood N, Figs. 1 and 4, constituting the lamp, and which is provided with a reflector O and chimney O'. The lamp is supported on the generator and connected thereto by the feet or supports P. When the supply or accumulation of gas would otherwise attain an abnormally high or dangerous pressure, it escapes at the joint of the rubber tube L² with the metal tubes L and L', which joint acts in the capacity of a safety-valve. The generator may conveniently be employed for table-lamps and other portable subjects of illumination.

I claim—

1. In a generator for acetylene-gas lamps, the combination with the water-supply tank, of a generating-chamber therein, provided with a detachable cover, having a depending tube centrally disposed in said generating-chamber, internally screw-threaded at its upper end, a perforated tube surrounding said first tube, a communicating passage between said second tube and the water-supply, and a valve-rod extending through said tubes and said detachable top, screw-threaded at its upper end to engage said central tube and provided at its lower end with a valve for controlling said communicating passage.

2. In a generator for acetylene-gas lamps, the combination with the water-supply tank, of a generating-chamber therein, provided with a detachable cover, a depending tube centrally disposed in said generating-chamber, internally screw-threaded at its upper end, a perforated tube surrounding said first tube, a communicating passage between said second tube and the water-supply, a valve-rod extending through said tubes and said detachable top, screw-threaded at its upper end to engage said central tube and provided at its lower end with a valve for controlling said communicating passage, and movable means for supporting the calcium carbid within said generating-chamber for withdrawing the residue upon decomposition of same.

3. The combination of the lamp, a water-supply tank, a generator-tank therein extending above said water-tank and provided at its upper end with a flanged portion, a lid for said generator-tank, a valve placed in convenient point of communication with generator and supply tanks, a rod with a regulating-valve, the correlation of vertical tubes fitting one within the other, provided with perforations and arranged so as to constitute a water seal, an outer tube provided with a bottom flange for withdrawal of the residue, and the hinged thumb-screws engaging said lid and generator-tank flange for giving ready access and operating substantially as described and shown on the drawings.

In testimony whereof I affix my signature in presence of two witnesses.

JAMES McCONECHY.

Witnesses:
JOSEPH HENRY PEARSON,
ROBT. HUTCHISON.